United States Patent [19]

Ohmura et al.

[11] Patent Number: 4,751,536
[45] Date of Patent: Jun. 14, 1988

[54] PHOTOGRAPHIC FILM PACKAGE

[75] Inventors: Hiroshi Ohmura; Keichi Yoshiura; Ikuo Fujimura; Kimiaki Nakada, all of Tokyo, Japan

[73] Assignee: Fuji Photo Film Co., Ltd., Kanagawa, Japan

[21] Appl. No.: 52,368

[22] Filed: May 19, 1987

[30] Foreign Application Priority Data

| May 19, 1986 | [JP] | Japan | 61-75089[U] |
| May 19, 1986 | [JP] | Japan | 61-75090[U] |
| May 19, 1986 | [JP] | Japan | 61-75091[U] |
| Oct. 6, 1986 | [JP] | Japan | 61-153249[U] |

[51] Int. Cl.$^4$ .................. G03B 17/02; G03B 17/26
[52] U.S. Cl. ................. 354/75; 354/203; 354/275; 354/288
[58] Field of Search .......... 354/75, 76, 203, 275, 354/288

[56] References Cited

U.S. PATENT DOCUMENTS

| 3,528,356 | 9/1970 | Eagle | 354/203 X |
| 3,603,232 | 9/1971 | Jones | 95/31 R |
| 3,731,586 | 5/1973 | Meazza | 354/76 |

FOREIGN PATENT DOCUMENTS

| 607242 | 8/1948 | United Kingdom . |
| 633614 | 12/1949 | United Kingdom . |
| 1024723 | 4/1966 | United Kingdom . |
| 1159446 | 7/1969 | United Kingdom . |
| 1309677 | 3/1973 | United Kingdom . |

Primary Examiner—Michael L. Gellner
Attorney, Agent, or Firm—Young & Thompson

[57] ABSTRACT

A photographic film package having at least a taking lens and a member for effecting an exposure, comprises a box-shaped internal film casing with its back open which removably contains a film cartridge therein; an exposure chamber in the internal film casing; a supporting member supporting and forcing the film cartridge against the exposure chamber so as to maintain the inside of the exposure chamber light-tight; and a box-shaped external film casing encasing the internal film casing therein and which is provided with openings for exposing the taking lens and the exposure effecting member.

12 Claims, 5 Drawing Sheets

PHOTOGRAPHIC FILM PACKAGE

BACKGROUND OF THE INVENTION

The present invention relates to a photographic film package, and more particularly to a photographic film package with a taking lens which comprises a rectangular box-shaped film casing with its back open and a film cartridge contained in the film casing in such a way as to isolate a film in the film cartridge from ambient light.

Often, photographers provide themselves with a camera for their trip, excursion, or holiday, to take commemorative or souvenir pictures. However, because the camera is a precision instrument and relatively massive and heavy, it is sometimes inconvenient to carry about. In addition to the inconvenience of carrying the camera, one often forgets to take the camera long. If in fact one who takes no camera along but wants to take pictures at a resort or the like, it is expensive to get a new one at the visited resort. Even if the cost can be ignored, it is often hard to find a camera shop in the vicinity.

THE PRIOR ART

Accordingly, it has previously been proposed to provide an extremely low cost photographic camera sold with a roll of film therein, which can be sold wherever photographic film is sold. The camera, after the exposure of all frames of the film, is forwarded to a photoshop or photo laboratory without removing the film. There, the exposed film is removed and developed to make prints therefrom while the camera without the film is scrapped.

Such a single-use camera is disclosed in U.S. Pat. No. 3,731,586. The camera is encased tightly in a camera casing which includes a retractable viewfinder having a pair of retractable parallel plates with viewing openings. However, because of the considerably complicated shape of pattern for the outer camera casing, the manufacturing cost of this single-use camera remains high. Such a camera is accordingly by no means practical as a single-use camera.

In addition to low cost, a requirement for such a camera is ease of removal of the exposed film from the camera.

OBJECTS OF THE INVENTION

It is, therefore, an object of the present invention to provide a photographic film package with a taking lens, which is quite simple in construction.

It is another object of the present invention to provide a photographic film package with a taking lens, of which the manufacturing cost is comparable to that of normally available films.

It is still another object of the present invention to provide a photographic film package with a taking lens, from which the film can be easily removed.

It is a further object of the present invention to provide a photographic film package with a taking lens, which causes no film deformation even if the film package is left in high temperature surroundings for a long time.

SUMMARY OF THE INVENTION

In order to achieve the above and other objects of the present invention, the photographic film package with a taking lens according to the present invention comprises a rectangular box-shaped internal film casing with its back open, which removably contains a film cartridge therein, and a box-shaped external film casing encasing tightly the internal film casing therein. When opened flat, the external casing is simple in pattern.

According to a feature of the present invention, the internal film casing with its back open has an exposure chamber against which the film cartridge is forced by supporting means so as to maintain the inside of the exposure chamber light-tight in spite of the internal film casing having its back open.

According to another feature of the present invention, the internal film casing is provided with openings which receive therein operating members such as a shutter release button, a film advancing knob, and the like in such a way that the operating members are substantially flush with the outer surface of the internal film casing. The flushness of the operating members with the outer surface of the internal film casing makes it easy to insert and package tightly the internal film casing in the external film casing.

According to still another feature of the present invention, the internal film casing with a film cartridge removably incorporated therein is provided with means which supports the film cartridge therein and forces it against an exposure frame formed in the internal film casing so as to maintain an exposure area defined by the exposure frame light-tight.

According to a further feature of the present invention, the internal film casing is formed with openings in its front wall providing access to the film cartridge. The provision of this access makes it easy to remove the film cartridge which is received tightly in the internal film casing.

According to a still further feature of the present invention, the film cartridge and the internal film casing are made of the same plastic materials. Although the film cartridge is apt to deform due to heat, nevertheless, since the internal film casing will deform in substantially the same way as the film cartridge, there is no gap produced between the film cartridge and the exposure frame and the exposure area is thus maintained light-tight. The internal film casing is preferably made of a styrene plastic. In this case, the internal film casing produces no formalin gas with which the film could be fogged over a long period of time.

BRIEF DESCRIPTION OF THE DRAWINGS

These and other objects and features of the present invention will become apparent from the following description taken in conjunction with the preferred embodiments thereof with reference to the accompanying drawings in which like parts are designated by like reference numerals throughout the views of the drawings and in which.

DETAILED DESCRIPTION OF THE INVENTION

The photographic film package according to a preferred embodiment of the present invention incorporates various elements, in particular exposure elements and film-advancing elements, similar to those of still picture cameras. Because such elements are well known to those skilled in the art, this description will be directed in particular to elements forming part of, or cooperating directly with the photographic film package embodying the present invention. It is to be understood that the film cartridges themselves may take any of various forms well-known to those skilled in the art and already commercially available.

Figures 1, 6:
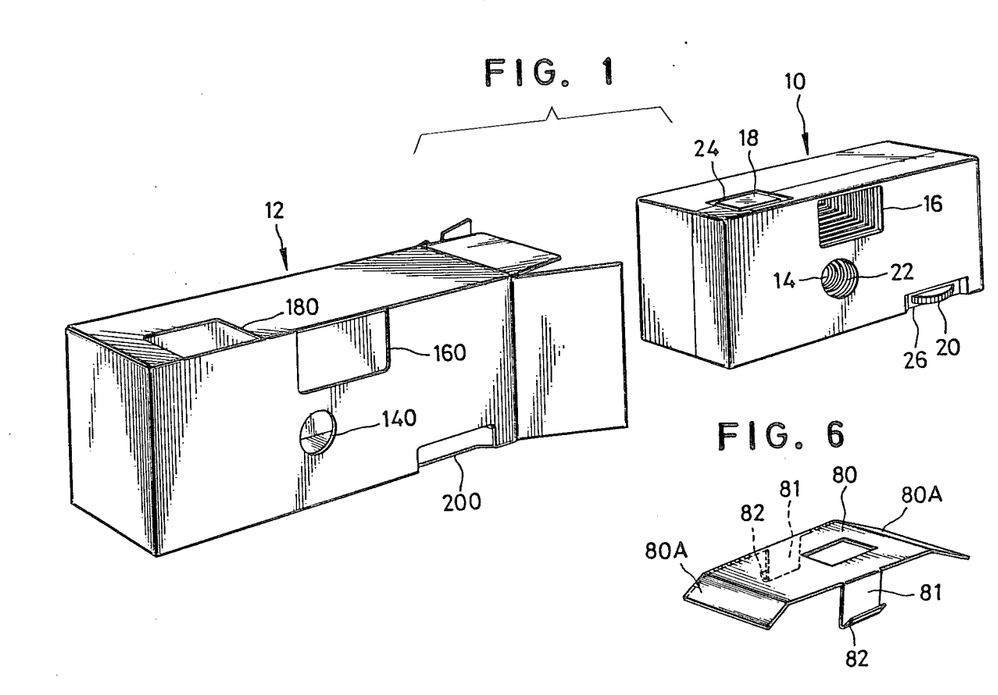
FIG. 1 is an exploded perspective view of the photographic film package of one embodiment of the present invention wherein the internal film casing is shown outside and to the right of the external film casing.
FIG. 6 is a perspective view showing another type of pressure plate for use with the internal film casing of FIG. 1.

Referring now to FIG. 1, shown therein is a photographic film package (which is hereinafter referred to as a film package for simplicity) of the present invention which is sufficiently cheap to be disposable. The film package comprises a rectangular box-shaped internal film casing 10 with a film cartridge preloaded therein and an external film casing 12 in which the internal film casing 10 is encased tightly. The internal film casing 10, which is desirably made of plastic materials, is open at its back and provided with a taking lens 14, a tunnel-like viewfinder 16, a shutter release button 18, and a film advancing knob 20 all of which are well known per se. Around the taking lens 14 is a frusto-conical bore 22 with circular grooves coaxially formed on the inner surface thereof for preventing diffused reflected light from entering the internal film casing 10 through the taking lens 14. There are also grooves formed on the inner surface of the tunnel-like finder 16 so as to prevent diffused reflected light from entering, thereby to provide an easy and clear observation of an object to be photographed.

In the top wall of the internal film casing 10 is an opening 24 with its inner periphery beveled, which receives therein the shutter release button 18 with its top surface flush with, or even below, the outer surface of the top wall of the internal film casing 10. At the bottom of the front wall of the internal film casing 10, there is formed an opening enclosed by a recess 26, which receives therein the film advancing knob 20 without its outer periphery projecting above the outer surface of the front wall of the internal film casing 10.

The internal film casing 10 thus constructed has no operating elements projecting outside any outer surface of the walls thereof. Due to the even surface of the internal film casing 10, the internal film casing 10 can be inserted smoothly into the external film casing 12 which will be described in more detail later. Although the outer periphery of the film advancing knob 20 is flush with the outer surface of the internal film casing 10, nevertheless the film advancing knob 20 can be operated easily because of the recess 26 around the opening through which the knob 20 protrudes.

Figure 2:
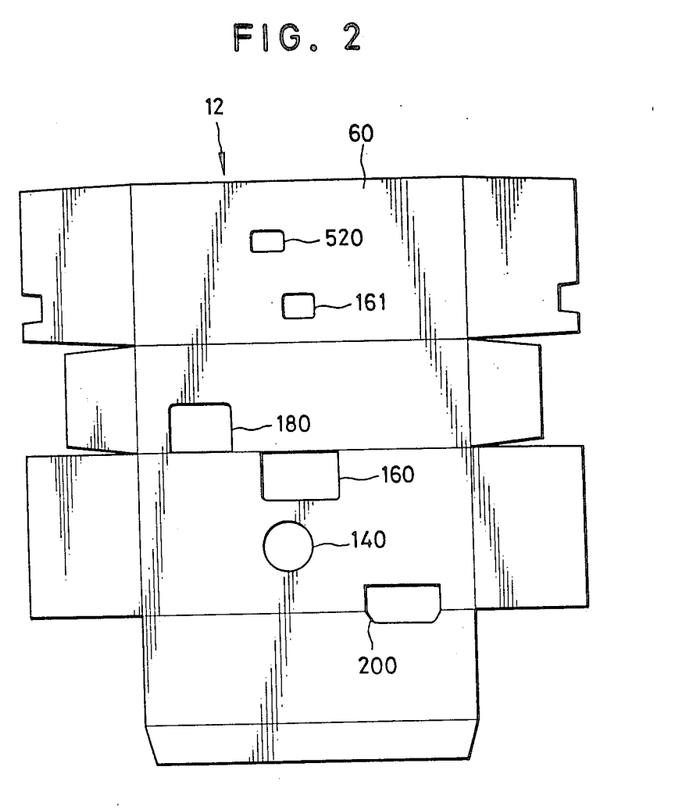
FIG. 2 is a developed plan view of the external film casing of FIG. 1.

The internal camera casing 10 described above is inserted into and packed tightly in the external film casing 12 which is made of a printable cardboard or a printable thin plastic sheet or the like. A blank 60 for making the external camera casing 12 has an unfolded shape shown in FIG. 2. The blank 60, to which printing and/or an ornamental surface pattern can be applied, is formed with a circular opening 140 therein for the taking lens 14, rectangular openings 160 and 161 to be aligned with the front and rear windows respectively of the tunnel-like finder 16, a rectangular opening 180 for the shutter button 18, a generally rectangular opening 200 for the film advancing knob 20, and a small rectangular opening 520 to be aligned with a frame counter window 52 of a film cartridge 30 (see FIGS. 4 and 5) which is well known per se in the art. After applying an ornamental surface pattern and the necessary printing, the blank 60 is folded into an open-ended box as the external film casing 12.

Figures 3, 4:
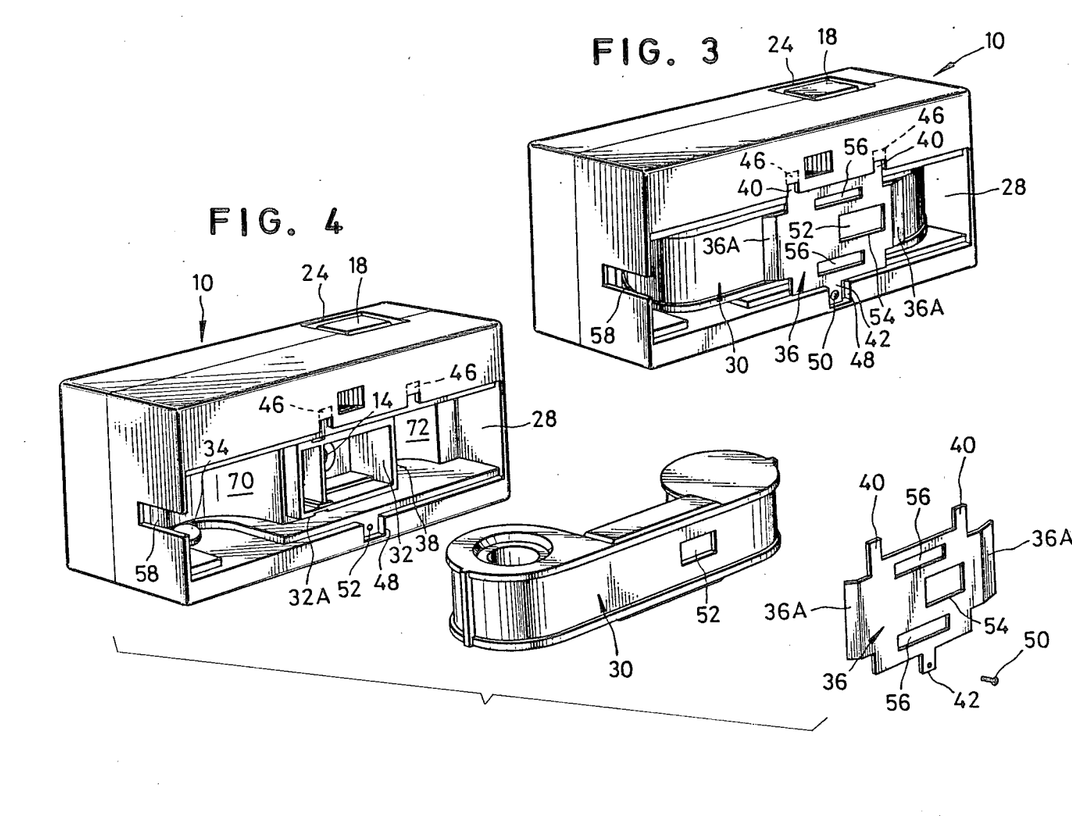
FIG. 3 is a rear perspective view of the internal film casing of FIG. 1 containing therein a film cartridge.
FIG. 4 is an exploded perspective view of the internal film casing and film cartridge and pressure plate of FIG. 3.

Referring to FIGS. 3 and 4, the internal film casing 10 with its back open has a film chamber 28 for receiving the film cartridge 30 containing, for example, a 110-size roll film therein. The film chamber 28 comprises compartments partly surrounded by curved partition walls 70, 72 on both sides of an exposure chamber 32 which will be described in detail later, each compartment being adapted to receive snugly a cylindrical film chamber of the cartridge 30 to be loaded in the internal film casing 10.

Figure 5:
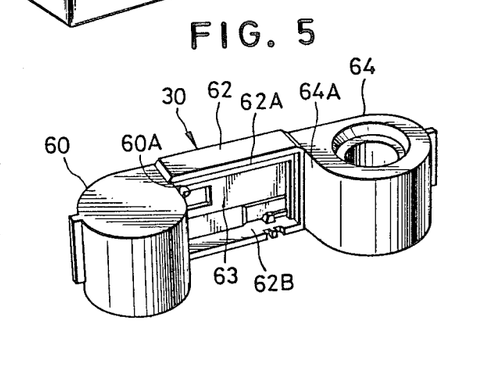
FIG. 5 is a perspective front view of the film cartridge of FIG. 4.

As is shown in detail in FIG. 5, the 110-size film cartridge 30 comprises a cylindrical film supply chamber 60, a cylindrical film take-up chamber 64, and a bridge 62 connecting the two cylindrical film chambers 60 and 64 and defining a film supporting plane 63 therebetween for flatly supporting the film from the film supply chamber 60 to the film take-up chamber 64. The bridge 62 is a rectangular box-like chamber defined by upper and lower walls 62A and 62B which, with the cylindrical chambers 60 and 62, are adapted to fit tightly against the margins of the exposure chamber 32.

Behind the taking lens 14 is the generally rectangular exposure chamber 32 of which the rear periphery 38 lies in the focal plane of the taking lens 14. When the film cartridge 30 is loaded in the internal film casing 10 in such a way as to insert the upper and lower walls 62A and 62B of the bridge 62 of the film cartridge 30 into grooves 32A formed between the exposure chamber 32 and the top and bottom inner walls of the internal film casing 10, the rear periphery 38 of the exposure chamber 32 fits against the inside walls of the bridge 62 of the film cartridge 32 and is brought into close contact with the film supported by the film supporting plane 63 of the bridge 62 of the film cartridge 30. The film cartridge 30 is, as is well known, provided with a gear at the bottom of a film wind-up spool (not shown) which is brought into mesh with a gear 34 provided at the bottom of the internal film casing 10 formed integrally with the film advancing knob 20 when the film cartridge 30 is placed in position in the internal film casing 10. Consequently, the film in the film cartridge 30 can be advanced by rotating the film advancing knob 20 one frame after every exposure.

After the loading of the film cartridge 30, a pressure plate 36 made of a thin sheet metal is attached to the internal film casing 10 in such a way to press resiliently the bridge 62 of the film cartridge 30 against the rear periphery 38 of the exposure chamber 32 at a predetermined constant pressur so as to form a labyrinth seal between the bridge 62 and the exposure chamber 32, thereby isolating completely the film from ambient light in spite of the internal camera casing 10 being open at the back and keeping the film flat.

For attaching the pressure plate 36 to the internal film casing 10, the pressure plate 36 is provided with lugs 40 spaced apart a certain distance along its upper edge and a lug 42 at the middle of its lower edge. On both sides of the pressure plate 36 are portions 36A bent slightly inward.

To receive this pressure plate, the internal film casing 10 is formed with grooves 46 and a recess 48 at the back of the internal film casing 10. The pressure plate 36 is attached to the internal film casing 10 with the upper lugs 40 in the grooves 46 and the lower lug 42 in the recess 48. The lower lug 42 in the recess 48 is further fastened to the internal film casing 10 by a set screw 50 screwed in a threaded bore 52. Due to the provision of the pressure plate 36, the film cartridge 30 is resiliently pressed by the side bent portions 36A of the pressure plate 36 to bring the bridge 62 of the film cartridge 30 into close contact with the rear periphery 38 of the exposure chamber 32, thereby keeping the inside of the exposure chamber 32 light-tight so as to isolate completely the film from ambient light as well as maintaining the film flat in the focal plane of the taking lens 14.

In the pressure plate 36, there is formed an opening 54 wich overlies the frame counter window 52 formed in the bridge 62 of the film cartridge 30, and upper and lower openings 56 extending sideways for allowing inserting a tool such as a screwdriver therethrough so as to snap the pressure plate 36 open in order to remove the film cartridge 30 for development. To snap out the pressure plate 36, either the upper lugs 40 are bent by or the set screw 50 is pulled out by stripping the threads of the bore 52. Because the internal film casing 10 is of a plastic material, the threads of the bore 52 can be easily stripped by wrenching the pressure plate 36 loose with a screwdriver.

For removing easily the film cartridge 30 from the internal film casing 10, there is a side opening 58 formed in a side wall of the internal film casing 10 for allowing the insertion of a tool such as a screwdriver therethrough. Although it might otherwise be hard to remove the film cartridge 30 from the internal film casing 10 because of the firm engagement between the gears of the film advancing knob 20 and the film take-up spool of the film cartridge 30, nevertheless the removal of the film cartridge 30 from the internal film casing 10 according to this embodiment is effected very easily with the aid of a tool such as a screwdriver inserted through the side opening 58.

The internal film casing 10 with the film cartridge 30 pre-loaded therein is encased tightly in the external film casing 12. As the internal film casing 10 is hidden by the external film casing 12, the internal film casing 10 can have unfinished surfaces. Therefore, the internal film casing 10 can be produced at a low cost. As the operating members such as the shutter release button 18 and the film advancing knob 20 are so incorporated in the internal film casing 10 as to be flush with the outer surfaces of the internal film casing 10, the internal film casing 10 can be inserted into the external film casing 12 without catching anywhere.

The internal film casing 10 is desirably made of the same material as the film cartridge 30. In practice, as the film cartridge 30 is made of thermoplastic materials such as styrene-type plastic materials, the internal film casing 10 in this embodiment is also made of a polystyrene material. Due to the homogeneity of these materials, the film cartridge 30 and the internal film casing 10 are deformable in substantially the same way as a result of excess heating because of having the same thermal expansion coefficient. Therefore, when the camera is left in, for example, a closed car parked in the sun for a long time, the film cartridge 30, if excessively deformed, can be seen to be unusable as a result of the corresponding deformation of the internal film casing 10, which is detectable. Consequently, one can avoid using the deformed film cartridge 30 in which the film is warped.

Furthermore, because of having the same thermal expansion coefficient, the exposure chamber 32 can be maintained light-tight whenever the film cartridge 30 and the internal film casing 10 deform.

Another advantageous feature of the use of styrene plastic material is the prevention of the film from being fogged by formalin gas produced when the camera is left unused for a long time.

The pressure plate 36 shown in FIG. 4 may be replaced with a press-in type pressure plate 80 shown in FIG. 6, which has upper and lower legs 81 bent inward at an approximately right angle and side bent portions 80A on both sides thereof. Each leg 81 has an end 82 folded back on the outer side thereof. The press-in type pressure plate 80 is made of a resilient material such as a sheet metal or plastic sheet. Therefore, the folded ends 82 and the side bent portions 80A can be resiliently deformable. The press-in type pressure plate 80 is attached to the internal film casing 10 in such a way as to insert the folded ends 82 into spaces provided between the upper and lower edges of the internal film casing 10 and the upper and lower walls 62A and 62B of the bridge 62 of the film cartridge 30. Because of the resiliency of the folded ends 82, the press-in type pressure plate 80 is firmly fixed to the internal film casing 10 and forces the film cartridge 30 forward by means of the side bent portions 80A, thereby maintaining the exposure chamber light-tight. To remove the film cartridge 30, the press-in type pressure plate 60 is pulled out either with a tool such as a screwdriver or by hand.

Figure 7:
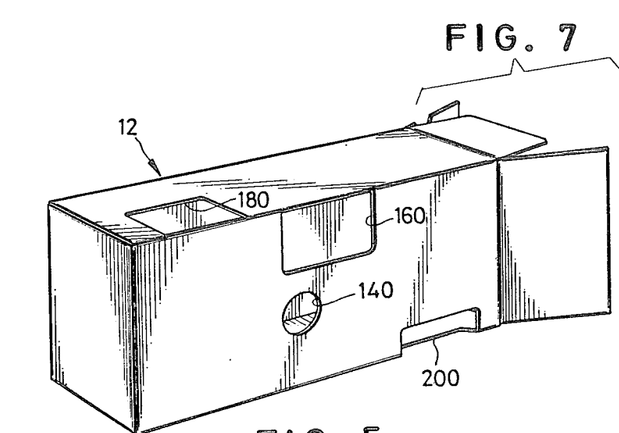
FIG. 7 is a view similar to FIG. 1 but showing another embodiment of the present invention.
Figure 8:
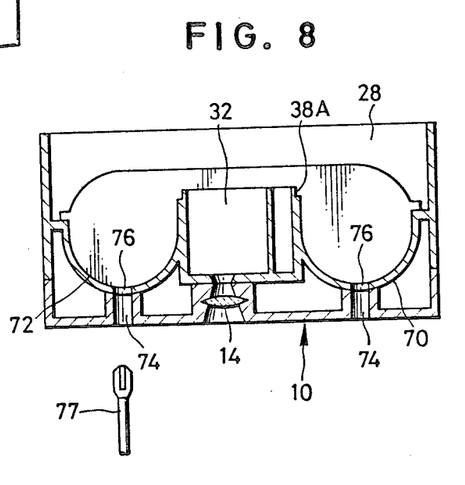
FIG. 8 is a transverse sectional view of the internal film casing of FIG. 7.

Reference is now made to FIGS. 7 and 8 showing therein the film package of another preferred embodiment of the present invention which is almost the same in construction as that described above and shown in FIGS. 1 to 4 except for the provision of access openings and the absence of pressure plate 36. As is shown in FIG. 7, there are formed access openings 74 on both sides of the frustoconical bore 22 in the front wall of the internal film casing 10 but no corresponding opening in the front wall of the external film casing 12.

As is shown in FIG. 8, each access opening 74 communicates with the interior of the film chamber 28 through an opening 76 formed in the curved partition wall 70, 72 of the film chamber 28. In the film chamber 28 of the internal film casing 10, the film cartridge 30 is loaded in the same way as described for the embodiment shown in FIGS. 1 to 4. However, in this embodiment, the film cartridge 30 is fixedly secured to the internal film casing 10 by adhesive bonding or heat welding the rear periphery 38 of the exposure chamber 32 to the inner side walls of the bridge 62 at 38A so as to form a labyrinth seal between the exposure chamber 32 and the bridge 62 of the film cartridge 30, thereby isolating completely the film from ambient light in spite of the internal film casing 10 being open at its back and keeping the film flat. However, it should be noted that the adhesive bonding or the heat welding of the film cartridge 30 is effected so as to allow a relatively easy separation from the internal film casing 10.

The internal film casing 10 with the film cartridge 30 pre-loaded therein is inserted into the external film casing 12 in the same way as described for the embodiment of FIGS. 1 to 4 and is packed tightly therein. Therefore, the camera of this embodiment has the same outer appearance as that of the embodiment shown in FIGS. 1 to 4.

After all the frames of the film in the film cartridge 30 are exposed, the film package is forwarded to a photo shop or photo laboratory to develop the film and to make prints. At that place, after removing the external film casing 12, the film cartridge 30 is popped out by inserting a tool such as a screwdriver 77 through the access openings 74 and the openings 76. As was previously described, since the adhesive bonding or heat welding of the cartridge 30 to the exposure chamber 32 is relatively weak, the film cartridge 30 can be easily separated from the internal film casing 10 by applying a proper thrust force thereto with the aid of the screwdriver 77. The internal film casing 10 with the film cartridge 30 removed is scrapped.

Figures 9A, 9B:
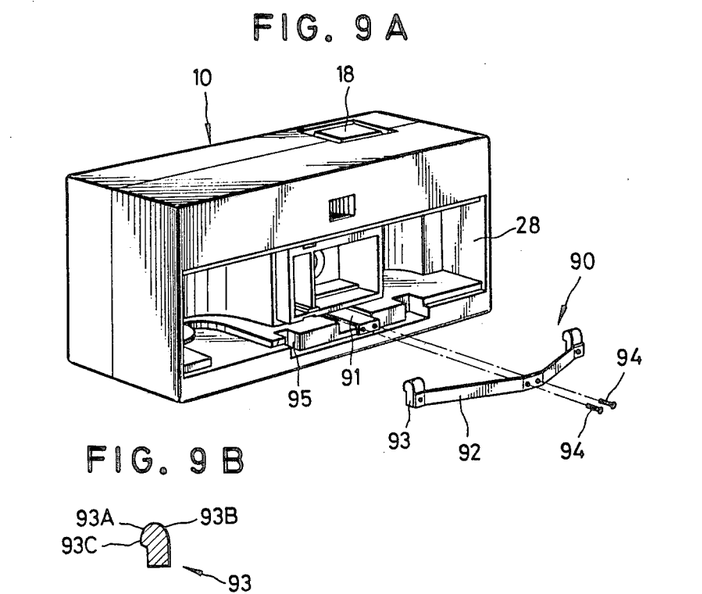
FIG. 9A is an exploded rear perspective view of an internal film casing of still another embodiment of the present invention.
FIG. 9B is a sectional view of a prop member of FIG. 9A.
Figure 10:
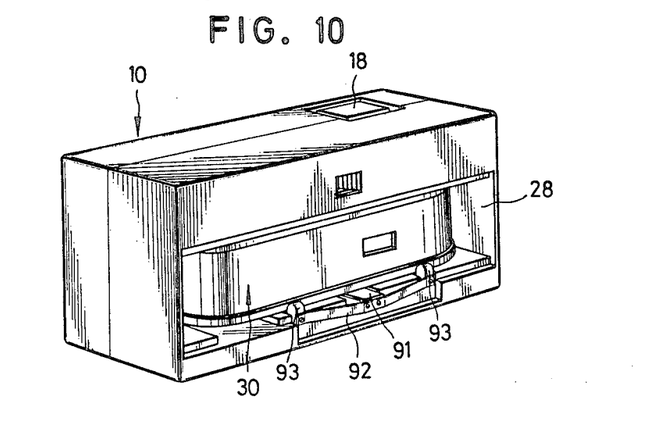
FIG. 10 is a view similar to FIG. 9A but showing the parts assembled and a film cartridge in place.

FIGS. 9A, 9B and 10 show the film package of still another embodiment according to the present invention, in which a spring clamp 90 is employed as the supporting means in cooperation with an internal camera casing substantially similar to the internal film casing 10 of FIG. 7 which has access openings in the front wall thereof. The spring clamp 90 comprises a resiliently bendable part 91 which extends like a tongue from the internal film casing 10 rearward, and a long strip of leaf spring 92 with prop members 93 on both ends thereof. The leaf spring 92 is connected by means of set screws 94 to a downwardly-extending tongue of part 91 and is biased in a direction to force the prop members 93 forward in recesses 95. Each prop member 93 has, as is shown in FIG. 9B, a top end with its front and rear surfaces 93A and 93B curved. The middle portion 93C of the front surface of each prop member 93 is flat and upright.

When loading the film cartridge 30 shown in FIG. 5, the film cartridge 30 is pushed into the internal film casing 10 through the rear opening. At this time, the bottom surface of the film cartridge 30 contacts and slides along the rear curved surface 93B of the prop members 93, pushing down the tongue-like part 91. At the end of the insertion of the film cartridge 30, the rear edge of the bottom surface of the film cartridge 30 rides over the rear curved surface 93B of the prop members 93. At this time the part 91 snaps back to its original position so as to push up the prop members 93. As a result, the prop members 93 are pushed back by the aid of the curved front surfaces thereof against the biased spring force of the leaf spring 92, thereby bringing the straight surfaces 93C thereof into engagement with the lower rear surface of the film cartridge 30 so as to press the bridge 62 of the film cartridge 30 resiliently against the rear periphery 38 of the exposure chamber 32 at a predetermined constant pressure as is shown in FIG. 10 and to isolate completely the film from ambient light in spite of the inner film casing 10 being opened at the back.

After the exposure of all frames of the film in the film cartridge 30, the film package is forwarded to a shop or laboratory to develop the film and make prints therefrom. Alternatively, the film cartridge 30 can be removed before being forwarded. In any event, the film cartridge 30 can be easily removed by popping it out with a tool such as a screwdriver or by pushing it out with a tool such as the access openings 74. Specifically, when pushing the film cartridge 30 out from the front, the lower rear surface of the film cartridge 30 pushes the prop members 93 to force the part 81 downward and rides over the top of each prop member 93. In this way, the film cartridge 30 is removed from the internal film casing 10.

The internal and external film casings of this embodiment can be reusable either if the used film cartridge 30 is removed and a new film cartridge is loaded by the photographer himself, or if at least the internal film casing, desirably also with the external film casing, is returned to the photographer.

Although the present invention has been fully described by way of various embodiments thereof with reference to the accompanying drawings, it is to be noted that the possibility of changes and modifications will be apparent to those skilled in the art. Therefore, unless otherwise such changes and modifications depart from the scope of the present invention, they should be construed as included therein.

What is claimed is:

1. A photographic film package having at least a taking lens and a member for effecting an exposure comprising:
   a rectangular box-shaped internal film casing with its back open;
   a removable film cartridge in said internal film casing;
   means defining an exposure chamber in said internal film casing;
   means supporting and forcing said film cartridge against said exposure chamber defining means to maintain said exposure chamber light-tight; and
   a rectangular box-shaped external film casing enclosing said internal film casing therein, said external film casing having openings for exposing said taking lens and said exposure effecting member.

2. A photographic film package as defined in claim 1, wherein said supporting and forcing means is a pressure plate removably attached to said internal film casing.

3. A photographic film package as defined in claim 1, wherein said forcing means comprises members engageable with said film cartridge at its margins, said members being supported by a resiliently bendable part extending rearwardly of said internal film casing.

4. A photographic film package as defined in claim 3, wherein said engageable members are supported by said resiliently bendable part through a spring member which forces said film cartridge against said exposure chamber defining means.

5. A photographic film pack as defined in claim 1, wherein said taking lens and exposure effecting member are at most flush with the outer surface of said internal film casing.

6. A photographic film package as defined in claim 1, wherein said external film casing is made of a printable cardboard.

7. A photographic film package as defined in claim 1, wherein said external film casing is made of a printable thin plastic sheet.

8. A photographic film package as defined in claim 1, both said film casing and said film cartridge being made of plastic having the same thermal expansion coefficient.

9. A photographic film package as defined in claim 8, wherein said plastic is a styrene polymer.

10. A photographic film package having at least a taking lens and a member for effecting an exposure comprising:
- a box-shaped film casing with its back open;
- a removable film cartridge in said film casing;
- an opening formed in the front wall of said film casing for allowing the insertion of a solid member into contact with said film cartridge;
- means defining an exposure chamber inside said film casing; and
- means supporting said film cartridge in said film casing so as to force said film cartridge against said exposure chamber defining means in order to maintain said exposure chamber light-tight.

11. A photographic film package as defined in claim 10, further comprising an external film casing enclosing said film casing therein, said external film casing having openings for exposing said taking lens and said exposure effecting member.

12. A photographic film package as defined in claim 11, wherein a said opening allowing the insertion of a solid member into contact with said film cartridge is provided on each side of said taking lens.

* * * * *